M. NIELL.
CAMERA.
APPLICATION FILED DEC. 13, 1916.
1,258,436.
Patented Mar. 5, 1918.
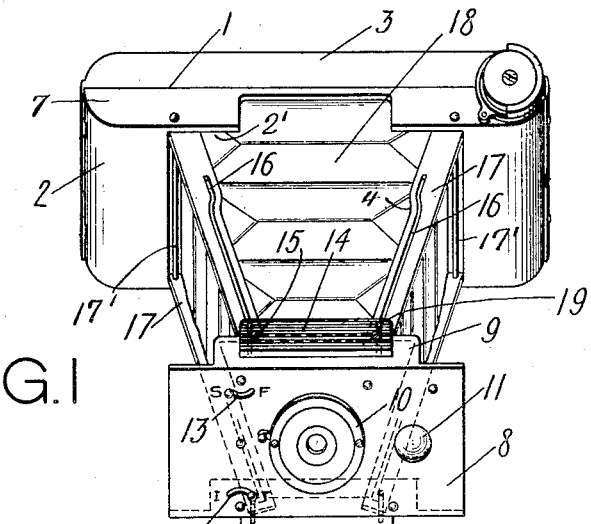
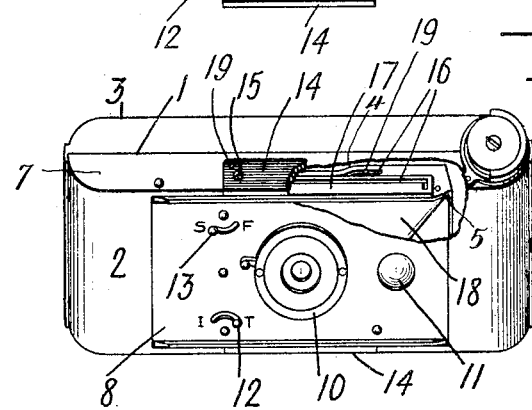
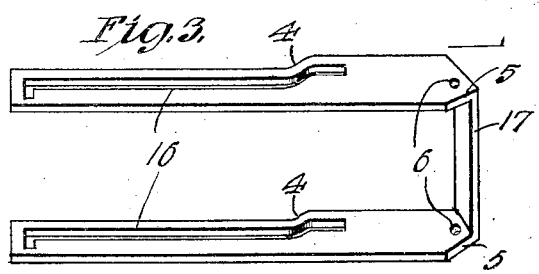
Inventor
Magnus Niell.
By his Attorney

UNITED STATES PATENT OFFICE.

MAGNUS NIÉLL, OF STOCKHOLM, SWEDEN.

CAMERA.

1,258,436. Specification of Letters Patent. Patented Mar. 5, 1918.

Application filed December 13, 1916. Serial No. 136,586.

*To all whom it may concern:*

Be it known that I, MAGNUS NIÉLL, a subject of the King of Sweden, residing at Stockholm, Sweden, have invented certain new and useful Improvements in Cameras, of which the following is a specification.

This invention relates to cameras, and more particularly to cameras of a telescoping or folding type.

It has for one of its objects the production of a camera very compact in construction and capable of, when folded up, occupying a very small space.

Another object is the provision of a camera having surfaces free of projections, protruding corners or edges, which are more or less apt to strike or catch upon foreign bodies.

Another object is the provision of a camera in which the strut members for supporting the lens plate are so made as to have their base concealed and their outer edges arranged to lie in a plane common to the front face of the camera when the bellows is folded or collapsed.

Another object is the construction of a camera wherein the lens-carrying plate is supported by collapsible strut members having tapering extensions or arms provided with guide-ways having the ends of their main channels out of alinement. Specifically, these guide-ways may comprise relatively offset straight channels connected by a curved channel.

Figure 1 is a perspective view of a camera embodying my invention, showing the camera opened ready for use; Fig. 2 is a perspective view, partly in section, showing the camera closed; and Fig. 3 is a perspective of the strut members for supporting the lens plate.

The camera shown in the drawings comprises a casing 1, consisting of front and rear sections 2 and 3, respectively, each of which has its end corners rounded off. A mounting frame 7 is permanently secured to the front section 2 and adapted to be completely housed when the parts of the casing 1 are assembled. A central aperture 2' is provided in the section 2, which extends across the breadth and major portion of the length thereof. A lens plate 8 normally closes this aperture when the camera is not in use. The lens plate is provided with longitudinally turned over edges 9 and carries a lens element 10, including a shutter, a finder glass 11 and timing elements 12 and 13. These elements just mentioned constitute no part of my invention and are, therefore, not disclosed or described in detail. A knurled gripping member 14 is secured to each of the turned over edges of the plate 8, which supplies a ready means for pulling out the plate when desired to use the camera. It will be noted that the gripping members 14 are spaced from the edges of the plate 8, and are mounted by means of screws 15. This spacing is effected by giving the turned over edges of the plate 8 a trough or U-shaped formation. Pins 19 are journaled between the gripping members 14 and the inner surface of the turned over edges of the plate 8, the position of said pins being as near the lower or inner corners of the gripping member 14 as possible. The object of locating the pins 19 in this manner is that since they are adapted to travel in guide-ways 16, provided in strut members 17, a greater focal length may be obtained from strut members of a minimum length when the lens plate is extended, which feature will be hereinafter more fully explained. The strut members 17 are journaled in the mounting frame by means of rods 17' passing through alined openings made at the base of said strut members and in the sides of the frame. The journaling of the strut members 17 is such that they are positioned with their bases normally concealed, and when extended, their rotation is limited by the edges thereof engaging the adjacent edges of section 2, which latter feature furnishes a means for exerting a pressure inwardly when the lens plate 8 is extended its full distance so as to maintain it in substantially fixed extended position.

In other words, by locating the base of the strut members 17, as shown, when they are rotated outwardly by pulling out the lens plate 8, the base of each of the strut members abuts against the adjacent edge of section 2 as the lens plate approaches the limit of its travel. By a continued outward movement of the lens plate until it reaches the end of its travel, the body portion of each of the strut members is slightly flexed, and this flexure is such that the free ends of the strut members are caused to move toward each other, permitting the transverse end portion of the channel members 16 to move into engagement with pins 19 upon the release of the lens plate 8.

The construction of the strut members 17 is clearly illustrated in Fig. 3. They are formed from a single piece of metal having the ends thereof bent at right angles to the central portion so as to form a U-shaped member. The guide-ways 16 are shaped substantially as shown, terminating at one end in slotted portions made at right angles to their main channels. These slotted portions function as a means for locking the lens plate 8 in an extended position by coöperating with the pins 19. The guide-ways 16 are comprised of two straight channels, having different longitudinal axes and joined by a curved channel. The corners 5 formed adjacent the central portion are cut away on one side, and the bearings 6 are located nearest the cutaway corners. Removing these corners and locating the bearings, as contemplated, permits the mounting of the strut members so that their base portions are concealed underneath the casing 1, yet said members are free to rotate a substantial distance. One edge 4 of each arm of the strut members is tapered or cut away, so that when the lens plate is moved, because of this feature and the conformation of the guide-ways 16, the arms of the strut members may freely pass back and forth between the gripping members 14, and the turned over edges of the lens plate 8, and when said plate is in normal position, the exposed edges of the strut members will lie in a plane common to the front face of the camera. Mounted immediately back of the lens plate 8 is a bellows 18, which constitutes the usual darkened chamber of this type of camera.

From the above description it will be seen that a camera embodying the features of construction of my invention is characterized by compactness, and, at the same time, being provided with all of the accessories furnished with a high-priced and much larger sized camera. In fact, to give an adequate idea of the compactness of my camera, it may be mentioned that the overall dimensions of the one used in making the drawings are length, three and one-half inches, breadth, one and one-half inches, depth, one-half inch. These dimensions are considerably under any standard camera now on the market, and my camera is truly of the "vest pocket type."

While I have illustrated and described but one preferred embodiment of my invention, I realize that it is susceptible of variation without changing the spirit and scope of the same.

Having thus described my invention, what I claim as new herein and desire to secure by Letters Patent, is:—

1. In a camera of the folding type, an inclosing case, a lens-carrying plate, strut members for supporting said lens plate, said members being formed in pairs from a single piece of metal bent in the shape of a U and having bearings located near the closed end thereof so as to accommodate a rod journaled in the sides of the casing, the position of said rod relative to the opening in the front face of the casing being such that the base of the strut members is concealed at all times.

2. In a camera of the folding type, an inclosing case, a lens-carrying plate, strut members for supporting said lens plate, said members being formed in pairs from a single piece of metal bent in the shape of a U and having bearings located near the closed end thereof, the arms of said strut members being tapered toward their free end, and guide-ways formed in each of said arm members.

3. In a camera of the folding type, an inclosing case, a lens-carrying plate, strut members for supporting said lens plate, said members being formed in pairs from a single piece of metal bent in the shape of a U and having bearings located near the closed end thereof, the arms of said strut members being tapered toward their free ends, and guide-ways formed in each of said arm members.

4. In a camera of the folding type, an inclosing case, a lens-carrying plate, strut members for supporting said lens plate, each of said members being provided with a guide-way comprised of straight channels connected by a curved channel.

5. In a camera of the folding type, an inclosing case, a lens-carrying plate, strut members for supporting said lens plate, each of said members being provided with guide-ways comprised of relatively offset straight channels connected by a curved channel.

6. In a camera of the folding type, an inclosing case, a lens-carrying plate having integral portions thereof bent to provide offset surfaces, strut members for supporting said lens plate and capable of movement between said offset surfaces, each of said members being provided with a guide-way having straight and curved portions.

7. In a camera of the folding type, an inclosing case, a lens-carrying plate having its upper and lower edges bent to provide offset surfaces, strut members for supporting said lens plate, each of said members being provided with a guide-way having straight and curved portions, and pins positioned between said offset surfaces adapted to travel in said guide-ways.

8. In a camera of the folding type, an inclosing case, a lens-carrying plate having integrally formed offset portions providing bearing surfaces, strut members for supporting said lens plate, capable of movement within said bearing surfaces, each of said members being provided with a guide-way having straight and curved portions, and means positioned between said offset surfaces adapted to travel within said guide-ways and forming stops for limiting the movement of said struts.

MAGNUS NIÉLL.

Copies of this patent may be obtained for five cents each, by addressing the "Commissioner of Patents, Washington, D. C."